(12) United States Patent
Nunes

(10) Patent No.: US 7,073,849 B1
(45) Date of Patent: Jul. 11, 2006

(54) SNAP-ON CHROME PLATED AUTOMOTIVE GRILLE OVERLAY

(76) Inventor: Mitchell Nunes, 8820 Maislin Dr., Tampa, FL (US) 33637

(*) Notice: Subject to any disclaimer, the term of this patent is extended or adjusted under 35 U.S.C. 154(b) by 0 days.

(21) Appl. No.: 11/146,977

(22) Filed: Jun. 8, 2005

(51) Int. Cl.
*B60R 13/04* (2006.01)

(52) U.S. Cl. .............................. 296/193.1; 296/139.09; 180/68.6; D12/216

(58) Field of Classification Search ............. 296/193.1, 296/193.09; 293/115; 180/68.1, 68.6; 428/31; D12/163, 166, 171, 216
See application file for complete search history.

(56) References Cited

U.S. PATENT DOCUMENTS

| | | | | |
|---|---|---|---|---|
| 2,501,065 | A * | 3/1950 | Longeway | 180/68.6 |
| 4,406,489 | A * | 9/1983 | Trabert | 293/115 |
| RE34,907 | E * | 4/1995 | Gross | 180/68.6 |
| 6,027,150 | A * | 2/2000 | Flewitt et al. | 293/115 |
| 6,041,878 | A * | 3/2000 | Daniels et al. | 180/68.6 |
| 6,167,645 | B1 * | 1/2001 | Gasko et al. | 40/200 |
| 6,206,438 | B1 * | 3/2001 | Pueyo | 293/115 |
| 6,287,672 | B1 * | 9/2001 | Fields et al. | 428/209 |
| 6,405,819 | B1 * | 6/2002 | Ohkura et al. | 180/68.1 |
| 6,422,643 | B1 * | 7/2002 | Pease | 296/193.1 |
| 6,527,317 | B1 * | 3/2003 | Fox et al. | 293/115 |
| 6,702,343 | B1 * | 3/2004 | Stull | 293/115 |
| 6,854,545 | B1 * | 2/2005 | Elwell et al. | 180/68.6 |

OTHER PUBLICATIONS

Trenz Grilles, Stylinconcepts Sports Truck Accessories Catalog from on or before Jul. 17, 2004.*

* cited by examiner

*Primary Examiner*—D. Glenn Dayoan
*Assistant Examiner*—Greg Blankenship
(74) *Attorney, Agent, or Firm*—Albert O. Cota

(57) ABSTRACT

A snap-on automotive grille overlay (10) that is formed with a thin-walled overlay body (20) configured to duplicate an existing automotive grille when nested thereupon. The overlay body (20) includes an essentially rectangular peripheral border (22) that incorporates a rim (24) extending inward from the border periphery. One or more horizontal slats (28) and vertical bars (26) are formed within the border rim to form an ornamental design that mates with a vehicle existing grille. A plurality of inward-protruding clips (32) are integrally formed within the slats and bars for connecting the grille to the vehicle. The clips are beveled (34) on an interior surface (36) and yield sufficiently to permit deflection over a vehicle grille, thus allowing the grille overlay to be snapped into place.

14 Claims, 2 Drawing Sheets

SNAP-ON CHROME PLATED AUTOMOTIVE GRILLE OVERLAY

TECHNICAL FIELD

The invention generally pertains to automotive grilles, and more specifically to a thermoplastic chrome plated grille overlay that duplicates an existing vehicle grille and snaps into place, thus producing an enhanced cosmetic effect to the vehicle.

BACKGROUND ART

The prior art has disclosed a variety of different shapes and designs to replace factory grilles, however few, if any, have developed overlay grilles that change the finished appearance by adding chrome plating and providing the ability to snap the overlay in place.

The prior art listed below did not disclose any patents that possess the novelty of the instant invention, however the following U.S. patents are considered related:

| U.S. Pat. No. | Inventor | Issue Date |
| --- | --- | --- |
| 5,487,575 | Chase | Jan. 30, 1996 |
| 6,027,150 | Flewitt et al. | Feb. 22, 2000 |
| 6,702,343 | Stull | Mar. 9, 2004 |

Chase in U.S. Pat. No. 5,487,575 teaches an automobile grille which is chromium plated so as to promote the flexural properties of the grille, which allow the grille to be more readily capable of withstanding a frontal impact.

Flewitt et al. in U.S. Pat. No. 6,027,150 discloses a radiator grille assembly for an automotive vehicle which includes an upper edge that engages the vehicle's hood and a lower edge that engages the vehicle's bumper. Resilient arms secure the upper portion to the vehicle and resilient means biases the upper edge of the grill to the hood when the hood is in a latched position.

Stull in U.S. Pat. No. 6,702,343 teaches an improved automotive grille and method of construction. The grille is built of aluminum and subsequently powder coated. Multiple stainless steel strips are attached to the leading edge of the grille, thereby reducing moisture within the coating and improving the decorative appearance of the grille.

For background purposes and as indicative of the art to which the invention is related reference may be made to the remaining cited patents issued to Oyama in U.S. design Pat. No. D361,968 and Marchese et al. in U.S. design Pat. Nos. D491,116, D494,112 and D494,895.

DISCLOSURE OF THE INVENTION

Historically, automobile grilles that cover and admit air to flow into radiators have been made of metal and chrome plated to provide corrosion protection. More recently, vehicle grilles have been made of injection molded thermoplastic with some being plated and others painted. Lately the trend has been to paint a grille, which blends the grille's appearance with the balance of the vehicle, but traditionalists still appreciate the rich and substantial look of a chrome plated grille. Therefore the primary object of the invention is to supply a grille overlay that has the configuration of an original equipment manufacturer grille and simply snaps into place securely over the existing grille, thus duplicating the appearance of a chrome grille without the necessity of removing the existing grille.

An important object of the invention is the easy installation of the grille overlay, as no tools are required and the person attaching the snap-on grille overlay simply places it over the existing vehicle grille until it snaps firmly in place with no further fastening required.

Another object of the invention is that the snap-on grille overlay is thin and replicates the existing grille so completely that it is not apparent to the casual observer that an overlay has been added.

Still another object of the invention is that the snap-on grille overlay is easily produced and, with respect to economies of numbers, the initial cost is reasonable and within the reach of all consumers.

Yet another object of the invention is that the snap-on grille overlay may be removed at a later date without affecting the existing grille in any way.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 6:
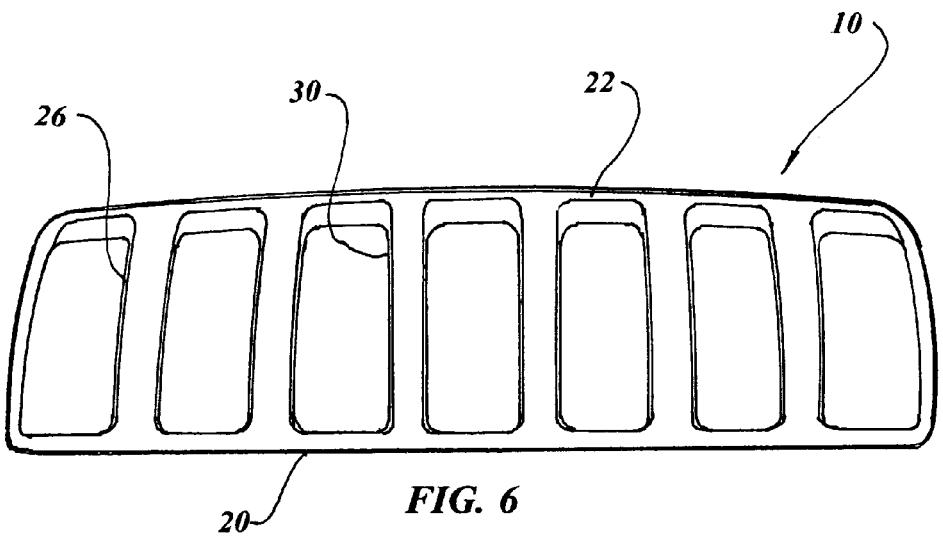
FIG. 6 is a front elevation view of a representative configured snap-on grille overlay having a rectangular peripheral border with only vertical bars.
Figure 7:
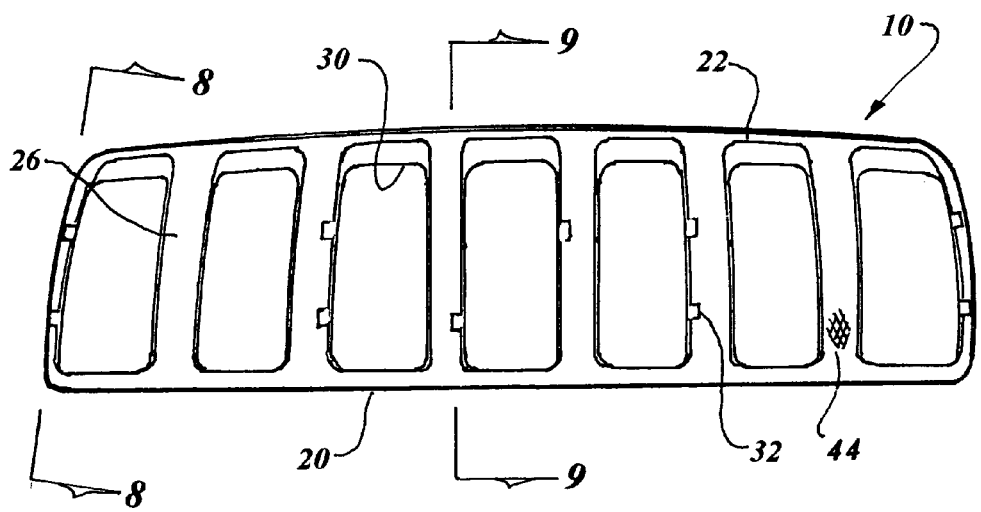
FIG. 7 is a rear elevation view of the above configured snap-on grille overlay having a rectangular peripheral border with only vertical bars.
Figure 8:
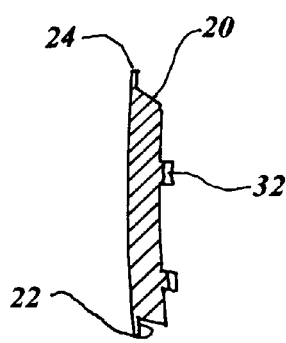
FIG. 8 is a cross-sectional view taken along lines 8—8 of FIG. 7 illustrating the configuration of the clips.
Figure 9:
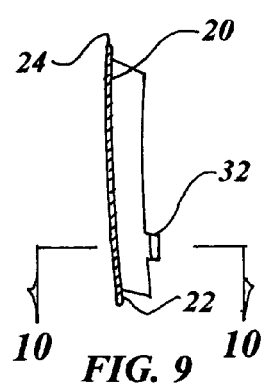
FIG. 9 is a cross-sectional view taken along lines 9—9 of FIG. 7 illustrating the configuration of one of the clips.
Figure 10:
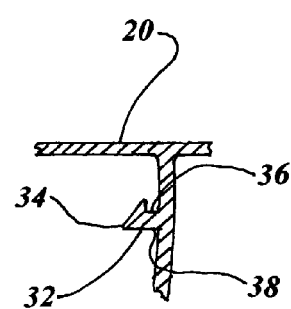
FIG. 10 is a cross-sectional view taken along lines 10—10 of FIG. 9.

The best mode for carrying out the invention is presented in terms of a preferred embodiment for a snap-on chrome plated automotive grille overlay 10. As shown in FIGS. 1 through 10, the grille overlay 10 is comprised of a thin-walled grille overlay body 20 that is configured to exactly duplicate an existing automotive grille when nested thereupon. The overlay body 20 consists of an essentially rectangular peripheral border 22 that includes a rim 24 that extends inward from the border 22, as best shown in FIGS. 6 and 7.

Most existing automotive grilles incorporate a plurality of vertical bars that are disposed perpendicularly within a border rim, and in many cases the body also includes at least one horizontal slat disposed within the same border rim, thereby forming essentially rectangular openings. The existing automotive grilles are configured in many shapes and designs and are differ from other manufacturers as well as individual models within the same line change sometimes insignificantly and other times substantially for each vehicle particularly in a new model year.

Figure 1:
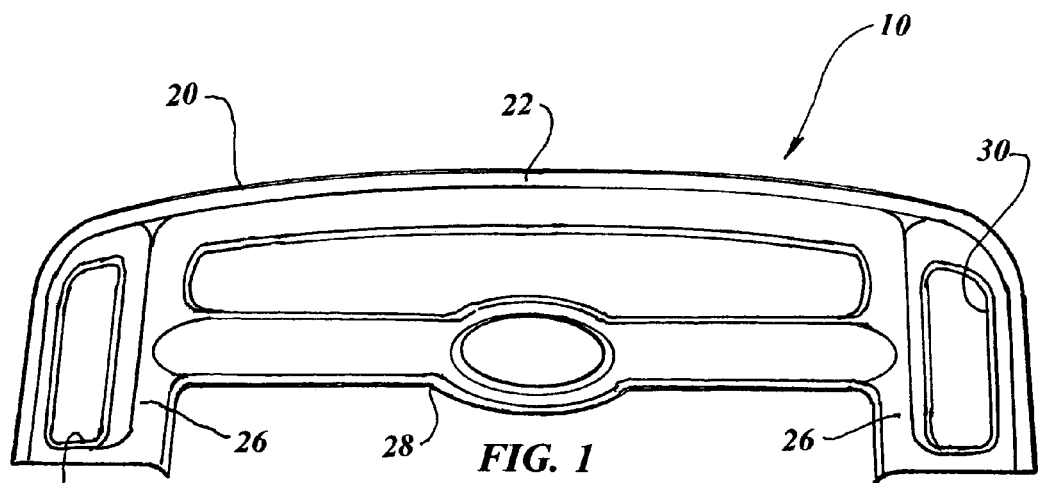
FIG. 1 is a front elevation view of a representative configured snap-on grille overlay having both horizontal slats and vertical bars.
Figure 2:
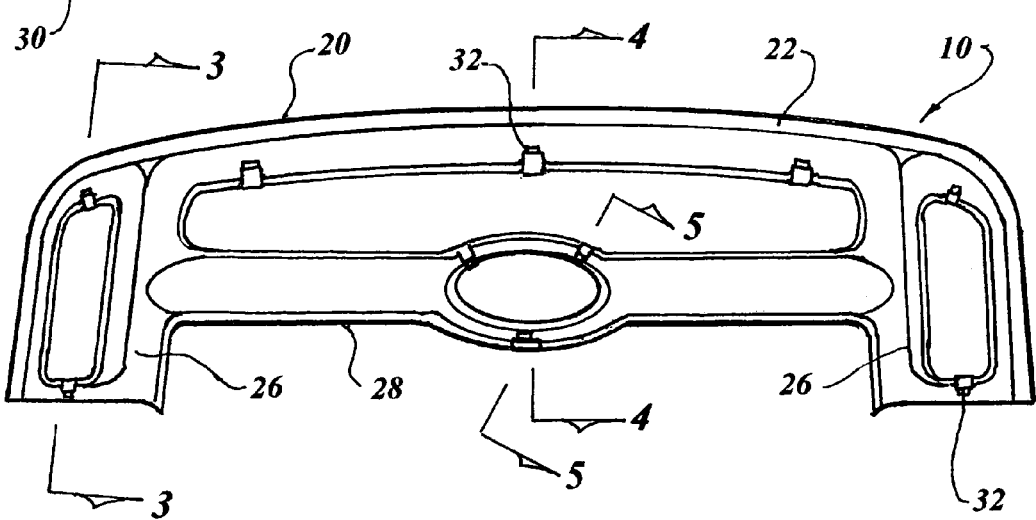
FIG. 2 is a rear elevation view of the above configured snap-on grille overlay having a rectangular peripheral border with both horizontal slats and vertical bars.
Figure 3:
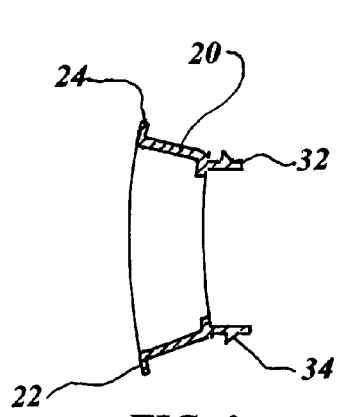
FIG. 3 is a cross-sectional view taken along lines 3—3 of FIG. 2 illustrating the configuration of the clips.
Figure 4:
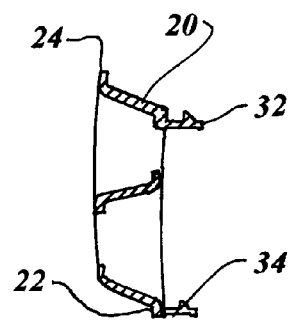
FIG. 4 is a cross-sectional view taken along lines 4—4 of FIG. 2 illustrating the configuration of the clips
Figure 5:
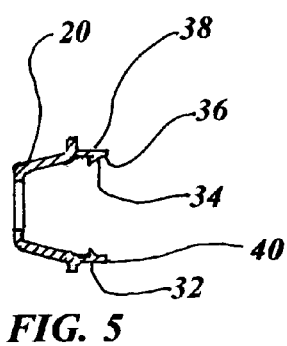
FIG. 5 is a cross-sectional view taken along lines 5—5 of FIG. 2 illustrating the configuration of one of the clips

Examples of the grille overlays 10 are shown in FIGS. 1, 2, 6 and 7, with FIGS. 1 and 2 showing a combined horizontal slat 28 and an opposed pair of vertical bars 26. FIGS. 6 and 7 show the rim 24, and a plurality of vertical bars 26 that form rectangular openings 30. It should be noted that the configuration of the overlay body 20 is not limited to the examples shown as there are as many types and styles as there are different vehicles. Some current vehicle grilles include irregular shapes, ovals, polygons etc., while others have no slats or bars and yet still fall within the scope of the invention.

The common feature of the grille overlay 10 is the addition of a number of inward protruding clips 32 that are integrally formed within the horizontal slats 28 and/or the vertical bars 26. The clips 32 have a bevel 34 on an interior surface 36, with the clip 32 configured to have sufficient resiliency to allow the clip 32 to be deflected over an exposed edge of a vehicle grille and snap into place. The clips 32 are integrally formed within the body 20 and include a straight shank 38 having a distal end 40. The bevel 34 extends outward from the shank 38 forming a right angular ledge 42, with the ledge 42 having a width sufficient to grip the existing vehicle grille. FIGS. 3–5 and 8–10 show the clips 32 in cross section.

Since the automotive grilles vary in shape and design the clips 32 illustrated are only representative, as the length, width and location may vary and still maintain the requisite shape and surfaces to function effectively. In some cases the clips 32 retain the overlay body 20 on the vehicle grille, and studs or protruding rectangular spacers orient the grille overlay 10, thus permitting the clips 32 to function appropriately.

The snap-on automotive grille overlay 10 is formed from a thermoplastic material such as acrylonitrile butadeine styrene (ABS), poly vinyl chloride (PVC), cellulose, polyethylene, polystyrene or polypropylene, and the chrome plating on the thermoplastic is produced by electroplating methods well known in the art and in common practice.

In order to prevent vibration from separating the overlay from the vehicle grille and to minimize noise levels, a cushioning material 44 may be attached to an inside surface of the thin-walled grille overlay body 20, as shown in FIG. 2. The cushioning material 44 can consist of double-sided adhesive tape or a foam coating that preferably consists of sprayed-on polyurethane.

In order to attach the grille overlay 10 to a vehicle, the overlay body 20 is placed on the existing vehicle grille and aligned accurately to the similarly formed mating parts. The overlay body 20 is then physically pressed into place, expanding the clips 32 until they deflect sufficiently to snap over the grille in the appropriate areas. For removal the opposite procedure is followed.

While the invention has been described in detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A snap-on automotive grille overlay comprising a thin-walled grille overlay configured to duplicate an existing automotive grille when nested thereupon, the grille overlay having a plurality of inward protruding clips integrally formed on said grille overlay, with said clips having a bevel on an interior surface that permits deflection over the automotive grille, thus allowing the grille overlay to be snapped into place wherein said inward protruding clips integrally formed on said grille overlay further comprise a straight shank having a distal end with said bevel extending outward from the shank, thereby forming a right angular ledge, with the ledge having a width sufficient to grip the existing automotive grille.

2. The snap-on automotive grille overlay as recited in claim 1 further comprising said grille overlay is formed from a thermoplastic selected from the group consisting of acrylonitrile butadeine styrene (ABS), poly vinyl chloride (PVC), cellulose, polyethylene, polystyrene and polypropylene.

3. The snap-on automotive grille overlay as recited in claim 1 wherein said grille overlay is chrome plated.

4. A snap-on automotive grille overlay comprising a thin walled chrome plated grille overlay configured to duplicate an existing automotive grille when nested thereupon, said grille overlay having;
   a) an essentially rectangular peripheral border including a rim extending inward from the border,
   b) a plurality of vertical bars disposed perpendicularly within said border rim, and
   c) a plurality of inward-protruding clips integrally formed within said vertical bars, with said clips beveled on an interior surface to permit deflection over the automotive grille, thus allowing the grille overlay to be snapped into place.

5. The snap-on automotive grille overlay as recited in claim 4 wherein said inward-protruding clips integrally formed on said grille overlay further comprise a straight shank having a distal end with said bevel extending outward from the shank, thereby forming a right angular ledge, with the ledge having a width sufficient to grip an existing vehicle grille.

6. The snap-on automotive grille overlay as recited in claim 4 further comprising said grille overlay is formed from a thermoplastic selected from the group consisting of acrylonitrile butadeine styrene (ABS), poly vinyl chloride (PVC), cellulose, polyethylene, polystyrene and polypropylene.

7. The snap-on automotive grille overlay as recited in claim 4 wherein said grille overlay is chrome plated.

8. A snap-on automotive grille overlay comprising a thin-walled grille overlay configured to duplicate an existing automotive grille when nested thereupon, the grille overlay having:
   a) an essentially rectangular peripheral border including a rim extending inward from the border,
   b) at least one horizontal slat disposed within said border rim,
   c) a plurality of vertical bars disposed perpendicularly within said border rim, and
   d) a plurality of inward-protruding clips integrally formed within said horizontal slats and said vertical bars, with said clips beveled on an interior surface to permit deflection over the automotive grille, thus allowing the grille overlay to be snapped into place, wherein said inward-protruding clips integrally formed on said grille overlay further comprise a straight shank having a distal end with said bevel extending outward from the shank, thereby forming a right angular ledge, with the ledge having a width sufficient to grip the existing automotive grille.

9. The snap-on automotive grille overlay as recited in claim 8 further comprising said grille overlay is formed from a thermoplastic selected from the group consisting of acrylonitrile butadeine styrene (ABS), poly vinyl chloride (PVC), cellulose, polyethylene, polystyrene and polypropylene.

10. The snap-on automotive grille overlay as recited in claim 8 wherein said grille overlay is chrome plated.

11. The snap-on automotive grille overlay as recited in claim 8 further comprising a cushioning material attached to an inside surface of the thin-walled grille overlay for preventing vibration from separating the overlay from the automotive grille.

12. The snap-on automotive grille overlay as recited in claim 11 wherein said cushioning material is comprised of double-sided adhesive tape.

13. The snap-on automotive grille overlay as recited in claim 11 wherein said cushioning material is comprised of a foam coating.

14. The snap-on automotive grille overlay as recited in claim 13 wherein said foam coating is comprised of sprayed-on polyurethane.

* * * * *